Dec. 28, 1954  K. G. MACKENZIE  2,697,920
FOOD FREEZING APPARATUS
Filed Feb. 25, 1952  5 Sheets-Sheet 4

INVENTOR
Kenneth Gordon Mackenzie
BY
Cameron, Kerkam & Sutton
ATTORNEYS

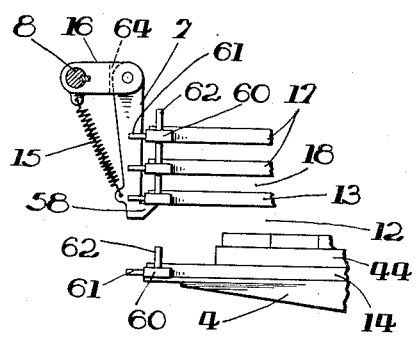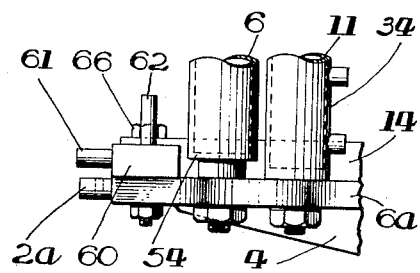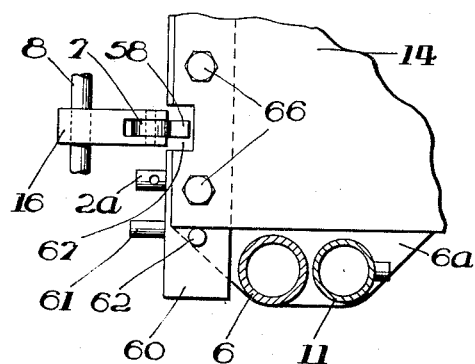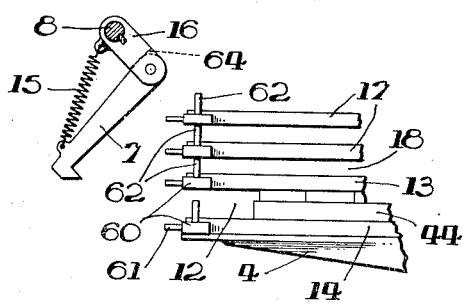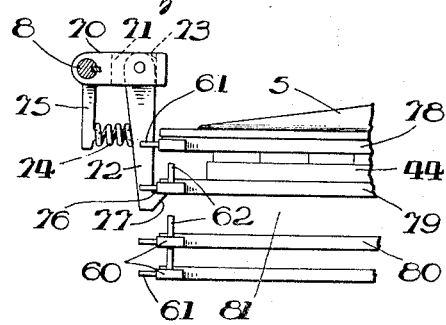

United States Patent Office 2,697,920
Patented Dec. 28, 1954

2,697,920

FOOD FREEZING APPARATUS

Kenneth Gordon Mackenzie, Port Sunlight, England, assignor to General Foods Corporation, New York, N. Y., a corporation of Delaware Application February 25, 1952, Serial No. 273,197

Claims priority, application Great Britain May 10, 1951

13 Claims. (Cl. 62—114)

The present invention relates to refrigerating apparatus and in particular to refrigerating apparatus of the multiplate type used for quick freezing foodstuffs and comprising a vertical stack of refrigerating plates, which are movable away from one another to receive the foodstuffs to be frozen between them and towards one another to engage the foodstuffs during freezing.

In refrigerating apparatus of this type, the refrigerating plates are enclosed in an insulated casing provided with one hinged wall forming a door for the purpose of loading the foodstuffs into freezing stations formed by the spaces between the plates. Such foodstuffs can be packed in cartons which are loaded directly or supported by trays into the apparatus or can be packed directly into trays for loading purposes. The plates are usually rectangular in shape and are hollow to permit the circulation of a refrigerant such as liquid ammonia therethrough. To load the apparatus with foodstuffs the hinged wall of the casing is opened. In one type of apparatus the lower plate of the stack is stationary relative to the other plates of the stack which are raised through varying distances to cause them to separate from one another so as to provide sufficient space for insertion of the tray into the freezing stations between each pair of adjacent plates. In another type of apparatus the upper plate is stationary relative to the other plates of the stack which are separated from one another by lowering them through varying distances. In yet another type of apparatus a number of freezing stations are formed within a stack of plates by pairs of plates which consist of a relatively stationary plate and a complementary relatively movable plate. In all these kinds of apparatus the loading of the foodstuffs into the freezing stations takes place at different levels. This means that, when inserting the foodstuffs into the upper freezing stations of the stack, the foodstuffs have to be lifted through considerable and varying heights. This lifting operation necessitates the employment of male labor since the trays, in which the foodstuffs are normally packed, are comparatively heavy. Again, before quick freezing can commence, each freezing station has to be filled with trays. This necessitates the storage, prior to loading, of sufficient filled trays to load the apparatus to capacity and such storage takes up a large amount of floor space. Furthermore, quick freezing can only proceed to its fullest extent when the plates contact the foodstuffs on both sides, a condition which cannot be established until the last batch of foodstuffs has been inserted into the apparatus. Therefore, some foodstuffs are in the apparatus for a considerable time, during which they undergo only partial quick freezing.

It is an object of the present invention to provide a refrigerating apparatus of the multiplate type, in which the above mentioned disadvantages are avoided.

The present invention provides refrigerating apparatus of the multiplate type, which comprises an insulated casing having a loading slot in a vertical wall thereof, a vertical stack of relatively separable refrigerating plates within said casing and alignment means for aligning the freezing station between two adjacent plates with said loading slot to enable foodstuffs to be inserted into said station through said slot.

The said alignment means may be arranged to align in succession each freezing station between adjacent plates of the stack with the loading slot. To this end the alignment means may comprise stack raising and lowering means for adjusting the vertical position of the stack of plates relative to said loading slot, in combination with means for preventing the movement of any one plate of the stack past said loading slot. For example, stop operating means may be provided for inserting stops underneath any one plate of the stack at a point substantially level with said slot, or above any one plate to arrest its ascent past said slot. The stack raising and lowering means may also be used to arrest the further movement of the plates beyond any such plate arrested by said stops to open the freezing stations between adjacent plates for loading and unloading. In addition, said stack raising and lowering means may be arranged to raise or lower the entire stack of plates. The said stack raising and lowering means may be hydraulically operated.

In the type of apparatus comprising a number of freezing stations formed by pairs of plates only one of which is movale relative to the other, the alignment means comprise means for aligning in sucession the freezing station between each pair of plates with the slot.

To enable the quick freezing of foodstuffs to commence immediately after the filling of a freezing station between adjacent plates through said loading slot, the apparatus according to the invention may be provided with compression means for causing the two plates immediately above and below the freezing station in alignment with said loading slot to approach one another to exert a positive pressure on any foodstuffs inserted into said station. Preferably the compression means comprise hydraulic means co-operating with the above mentioned stop operating means and arranged to compress the whole stack of plates together when said stops are in an inoperative position.

To facilitate rapid discharge of foodstuffs after quick freezing, a discharge slot similar to the loading slot may be provided in the side wall of the casing opposite to that containing the loading slot. Insulated plugs hinged to the casing may be provided for closing both the loading and discharge slots. The apparatus according to the invention may also be provided with extensible refrigerant supply and discharge headers to allow for variations in the positions of the stacks relative to the casing walls.

Apparatus embodying the invention will now be described with reference to the accompanying diagrammatic drawings in which:

Figs. 7, 8 and 9 are detailed side views illustrating the operation of the part of the stop operating means shown in Fig. 6;

Fig. 10 is a detailed view of the bottom plate and one lower corner of the stack;

Fig. 11 is a plan view of the plate and corner shown in Fig. 10; and

Fig. 12 is a detailed view of a modified form of stop operating means.

Figure 2:
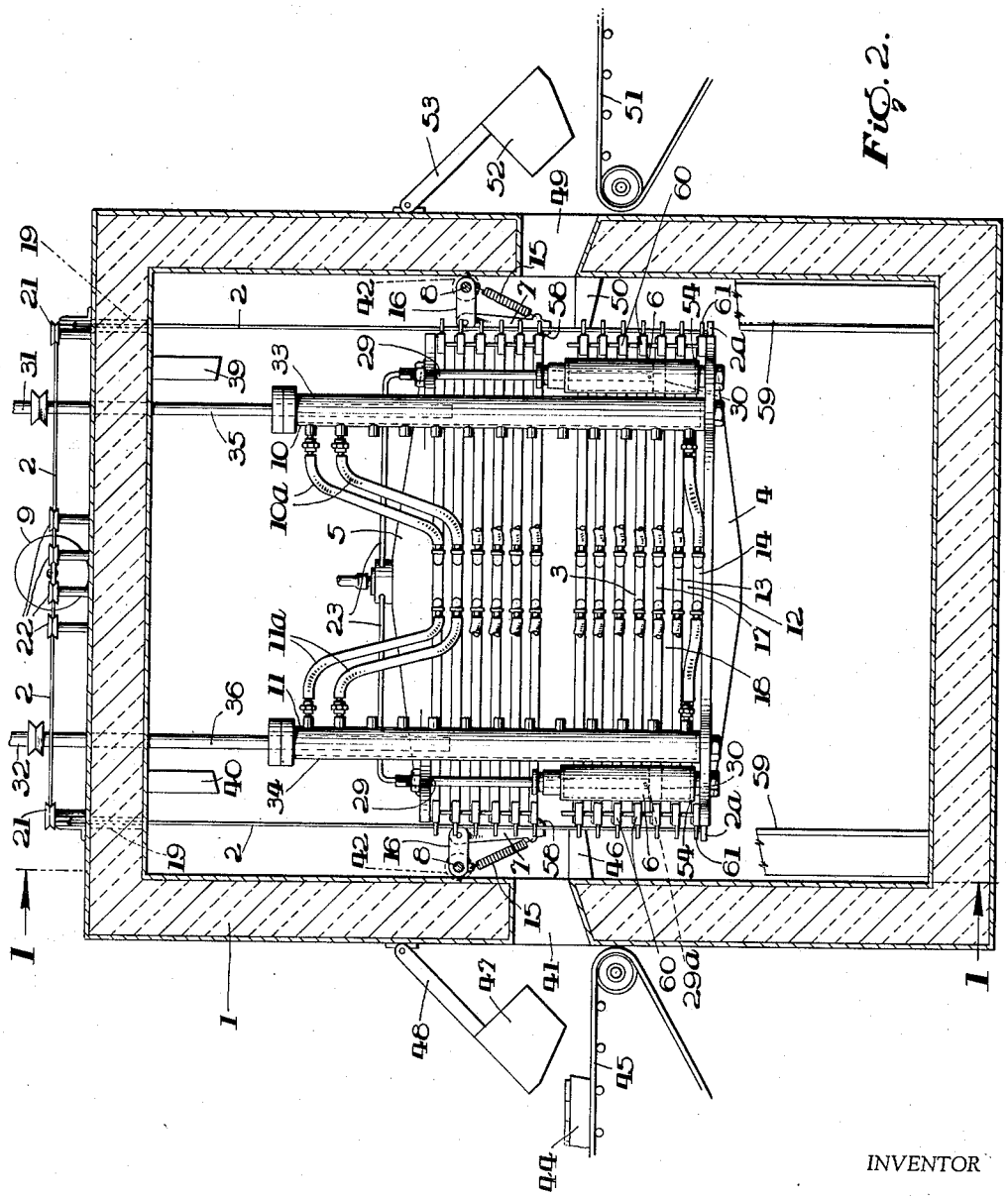
Fig. 2 is a rear end view of the apparatus of Fig. 1 with the rear end wall of the casing removed, as indicated by the section line 2—2 in Fig. 1.

Referring to the drawings, an insulated casing 1, having a loading slot 41 in one side wall as in Fig. 2, encloses a stack of relatively separable refrigerating plates 3. This stack of plates is suspended within the casing by four wire ropes 2. These wire ropes are connected to lugs 2a at the corners of a platform 4, on which the stack of plates is built up, and pass out of the casing through channels 19 in the roof. The four wire ropes then pass over pulleys 20 having a horizontal axis and around pulleys 21 and 22 having a vertical axis, as in Fig. 3. The ends of the four adjacent parallel wire ropes are connected to a piston rod 24 connected to a piston head 25 of a horizontal hydraulic cylinder 9 supported on the roof of the casing. Oil entry and discharge conduits 26 and 27 respectively enable oil pressure to be applied to the piston head 25. By applying and releasing the oil pressure on the piston head 25, the wire ropes can be caused to move up and down within the casing to raise and lower the stack of plates 3. Stops 39 and 40 fixed to the inside of the casing roof limit the upward traverse of the stack so as to allow sufficient space between the stack and the roof of the casing to accommodate the extensible oil conduit 28, described below. The arrangement of wire ropes, pulleys and hydraulic cylinder 9 comprises the stack raising and lowering means referred to above.

Figure 3:
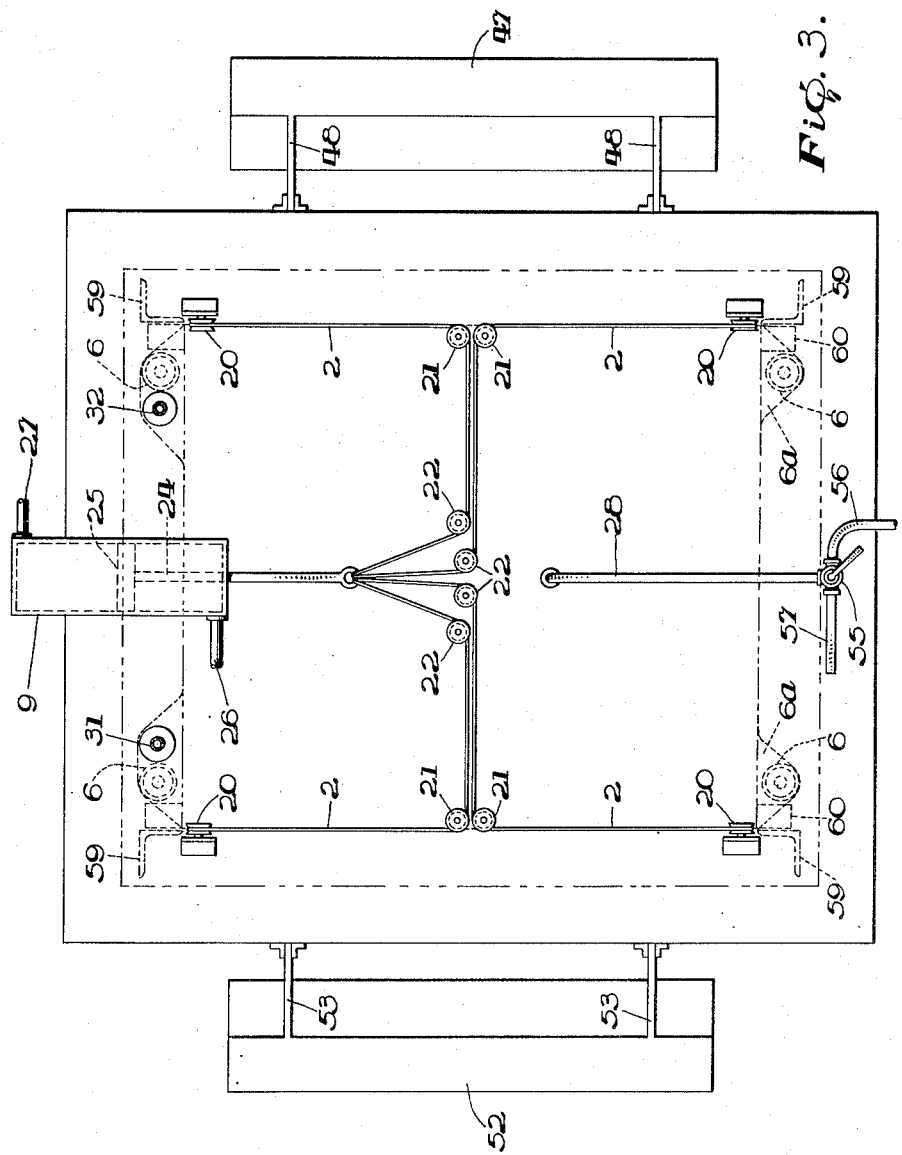
Fig. 3 is a plan view of the apparatus of Figs. 1 and 2.

The stack of refrigerating plates 3 built up on the platform 4 supports a platform 5, which is sufficiently rigid to ensure that the top of the stack is always kept flat. Platforms 4 and 5 are connected together by four hydraulic cylinders 6 located at the corners of the platforms outside the stack of plates 3. One end of the cylinder body 54 of each cylinder 6 is attached to a support 6a projecting from the adjacent corner of platform 4 and the piston rod 29 is similarly attached to the corresponding corner of platform 5. An extensible conduit 28 and branch conduits 23 conduct oil from an oil pump (not shown) down the hollow piston rods 29 to openings 29a on the top sides of the piston heads 30 of the cylinders 6, to draw the platforms 4 and 5 together. The extensible conduit 28 is connected to a two way valve 55 connected to the oil pump by a conduit 56 and to atmosphere by a conduit 57 (Fig. 3). The arrangement of cylinder 6, conduits, oil pump and platforms 4 and 5 comprise the compression means referred to above.

Figure 4:
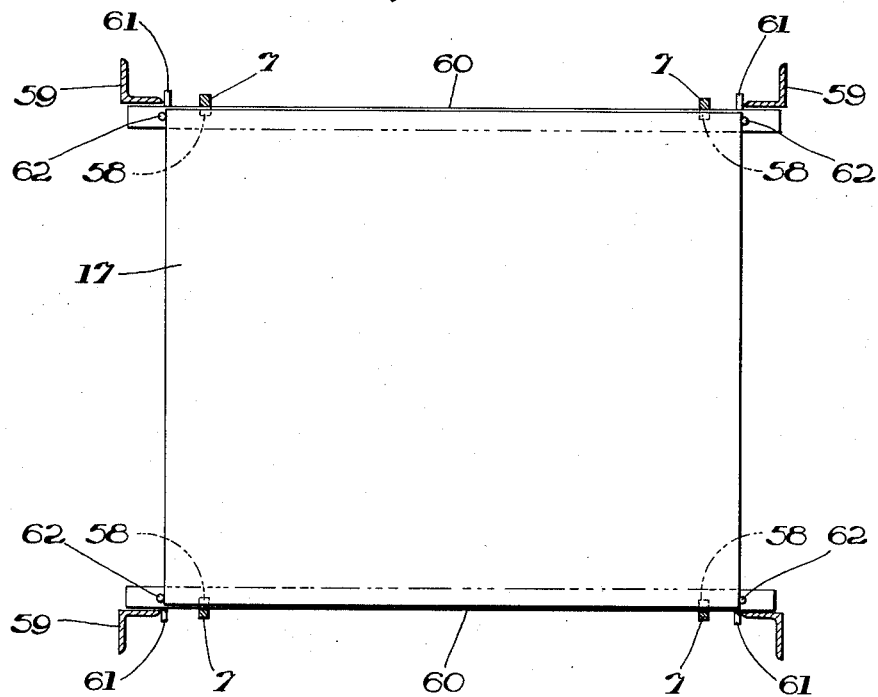
Fig. 4 is a detailed plan view of a plate of the stack illustrating the arrangement for guiding the vertical movement of the plates.
Figure 5:
Fig. 5 is a detailed side view of any three plates of the stack illustrating the manner in which the plates are supported on top of one another.

The plates of the stack 3 are located above one another. To ensure that all the plates descend parallel to one another and do not move sideways out of the stack, the stack is arranged to travel between four vertical guide bars 59 extending between the roof and floor of the casing. These bars are shown broken off above and below the stacks in Figs. 1 and 2 and are made of angle iron of right-angular cross section as shown in Figs. 3 and 4. Each of the plates forming the stack 3 is reinforced along the sides adjacent to the guide bars 59 by stout metal bars 60 the ends of which project beyond the plates and are provided with projections 61 near each end, as in Figs. 4 and 5. These projections 61 move in contact with the edges of the guide bars 59 and the ends of the bars 60 move along the faces of the guide bars 59 when the stack is raised and lowered and prevent the plates forming the stack from moving out of alignment. Each bar 60 on each plate is provided with vertical pegs 62, which act as limiting stops to ensure that the faces of two adjacent plates never come into contact with one another: that is, the pegs 62 provide that there is always a minimum space between each pair of adjacent plates. This space is denoted by 65 in Fig. 5.

Each plate of the stack is connected to extensible refrigerant supply and discharge headers 10 and 11 (Fig. 2) preferably mounted on the supports 6a at one end of the stack. These headers may be located at the side of the stack of plates and joined to each plate by flexible conduits 10a and 11a in the manner described in British patent specification No. 588,826 or by any other suitable means. The headers 10 and 11 are in turn connected to a liquid ammonia refrigerating circuit (not shown) through connections 31 and 32 outside the casing. The two headers are constructed from outer tubes 33 and 34 carried by platform 4 and inner tubes 35 and 36 slidable through leakproof glands in tubes 33 and 34 respectively, the tubes 35 and 36 being fixed to the roof of the casing.

Figure 1:
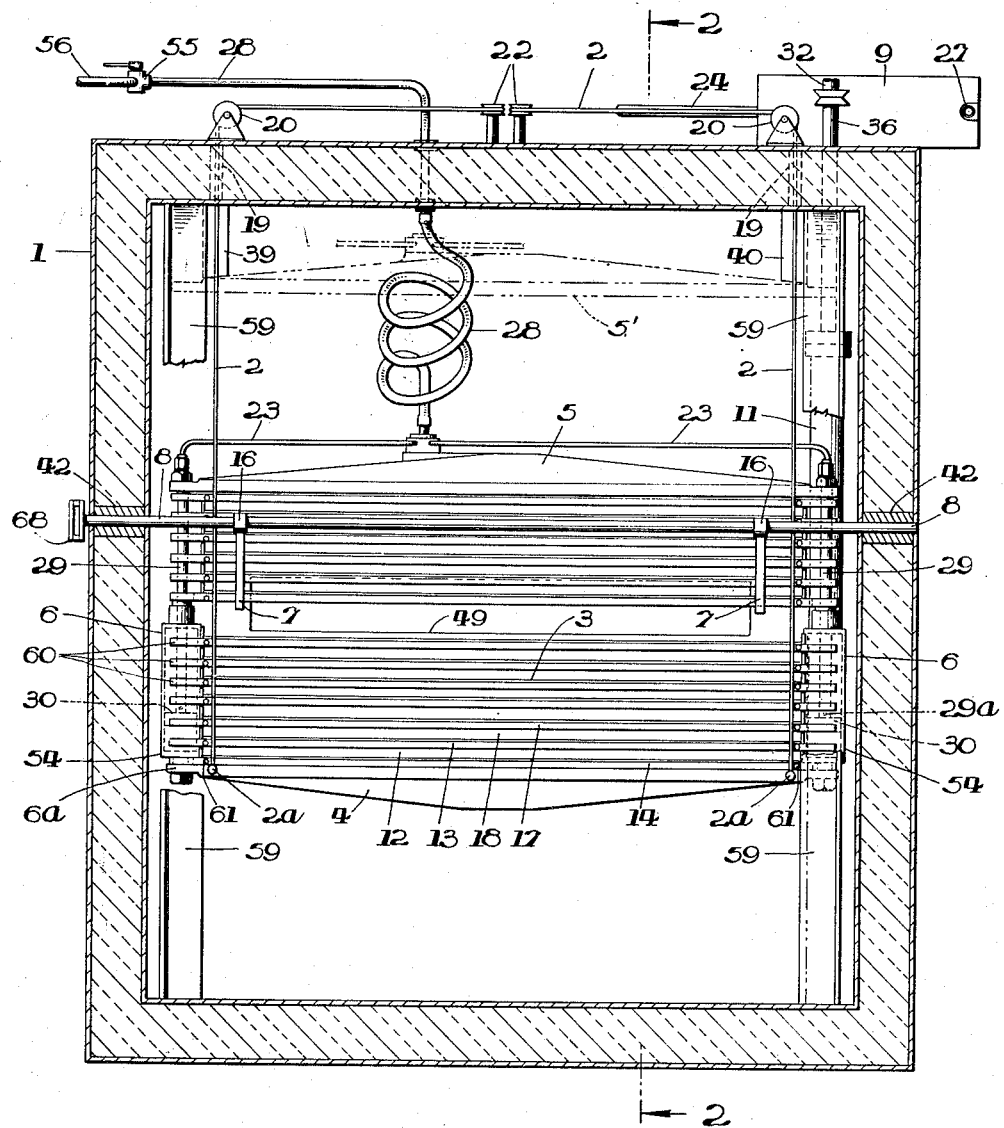
Fig. 1 is a side view of an embodiment of the invention with one side wall of the casing removed to show the inside thereof, as indicated by the section line 1—1 in Fig. 2.
Figure 6:
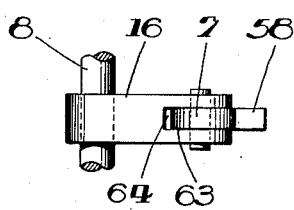
Fig. 6 is a detailed plan view of a part of the stop operating means.

Two parallel shafts 8 supported in bearings 42 in the end wall of the casing 1 are located in front and behind the stack of plates. One of these shafts supported in two bearings 42 in opposite walls of the casing 1 is shown in Fig. 1. One end of each shaft projects outside the casing and carries a lever 68 (Fig. 1) to facilitate the rotation of the shafts. Each shaft 8 carries two arms 16, as in Fig. 2, these arms being keyed to the shafts 8 at points along its length adjacent points on the plates slightly inset from each corner thereof. Hooks 7 are pivoted within forks 63 on arms 16, as shown in Fig. 6, the faces 64 of which forks act as stops limiting the rotation of hooks 7 in one direction about their pivots on the arms 16. A spring 15 connects each of these hooks to the appropriate shaft 8, as shown in Fig. 2 and in the detail views in Figs. 7, 8 and 9. The hooks 7 are so arranged on arms 16 that they do not interfere with the passage of trays of foodstuffs in and out of the casing: that is, the hooks 7 are on either side of the loading and discharge slots. Thus, for example, in Fig. 1, where the location of the loading slot is indicated by the rectangle 49 mentioned below, the hooks 7 shown are on either side of this rectangle. The projections 58 at the bottom of these hooks are capable of being inserted on the underside of any plate of the stack to engage the undersides of the bars 60 on the plates, as for example in Fig. 2, to prevent that plate and all the plates above it from descending past the loading aperture when the stack 3 is lowered. The projections may also be withdrawn from under any plate of the stack in a manner to be described later. These projections 58 and the arrangement of shafts, arms, springs and hooks constitute respectively the stops and the stop operating means referred to above.

The loading slot 41 is located at such a height in the wall of the casing as to enable trays of foodstuffs to be quick frozen to be inserted therethrough without undue lifting. To this end trays 44 containing the foodstuffs may be conveyed to the loading slot on a loading conveyor 45, as in Fig. 2. A shelf 46 provided on the inside of the casing 1 guides the trays from the slot into the stack of plates. A plug 47 of insulated material on arms 48 hinged to an outer wall is provided for closing the loading slot. A discharge slot 49 is located on the wall of the casing opposite to that containing the loading slot 41, the two slots being on the same level. A shelf 50 is provided for guiding trays discharged from the stack of plates 3 through the slot 49 and on to a discharge conveyor 51 for removing discharged trays from the vicinity of the apparatus. A plug 52 of insulated material on arms 53 hinged to the casing wall is provided for closing the discharge slot.

The operation of the apparatus is as follows:

Oil pressure is applied to cylinder 9 to raise the stack of plates until platform 5 contacts stops 39 and 40 in Fig. 1, that is, until the platform 5 is in the position 5′ represented by the broken lines in Fig. 1. The stops 39 and 40 are preferably arranged so that when the platform 5 is in the position 5′, platform 4 is above the level of the slots, 41 and 49. Shafts 8 are then rotated by means of levers 68 until the projections 58 on the hooks 7 are in the vertical path of the plates comprising the stack 3. To ensure that the four hooks 7 move together the levers 68 attached to the two shafts 8 (Fig. 2) may be linked together and actuated by a common mechanism in any conventional manner.

When the projections 58 are in the vertical path of the plates the oil pressure in cylinder 9 and in cylinders 6 is released and the stack of plates 3 allowed to fall under gravity. Provision is made to allow the bottom plate 14 and platform 4 to pass the projections 58 even when these projections are in the path of the descending stack. To this end, plate 14 is bolted to platform 4 by bolts 66, which all pass through the reinforcing bars 60 on plates 14, such bolts being shown in the detailed views of a corner of plate 14 and platform 4 in Figs. 10 and 11. Notches 67 are provided near each corner of the combined plate-platform assembly in positions corresponding to the points of engagement of the projections 58 with the other plates of the stack. One such notch 67 is shown in the detailed plan view in Fig. 11 of the corner of the plate 14 and platform 4 shown in Fig. 10. On lowering the stack, the hooks 7 and projections 58 are passed through these notches and consequently the projections 58 are unable to arrest the descent of plate 14 and platform 4. No such notches are provided on any of the other plates. After plate 14 and platform 4 have dropped below the level of the projections 58, these projections can engage the underside of the bars 60 on plate 13 and this plate and all the plates above it together with platform 5 and the piston heads 30 and piston rods 29 of the hydraulic cylinders 6 are prevented from descending further. Platform 4, refrigerant plate 14 and the bodies 54 of the cylinders 6, however, continue to descend under the action of gravity.

When the freezing station consisting of the space 12 between the arrested plate 13 and the descending plate 14 has increased sufficiently to permit the insertion of the tray 44 of foodstuffs into it, oil flow from cylinder 9 is stopped and the further descent of platform 4, plate 14 and cylinder bodies 54 arrested. Tray 44 is then inserted into the freezing station 12 through slot 41. At this stage the positions of the projections 58 and of the other elements cooperating therewith are as illustrated in the detailed view of one such projection and set of cooperating elements in Fig. 7.

Referring now to Figs. 7, 8 and 9, by way of example, the shafts 8 are then rotated to the positions shown in Fig. 8. As each hook 7 is hinged, the projections 58 on the hooks and all parts of the stack above the hooks move vertically downwards, the springs 15 becoming extended in the process. The springs are light and are prevented from pulling the projections 58 from underneath this plate by the weight of all the plates bearing on these projections. As soon as plate 13 has dropped to the position shown in Fig. 8, however, this weight is transferred from projections 58 on to the tray 44 of foodstuffs to be frozen (or if no tray is present on to the pegs 62 of plate 14). Springs 15 are thus enabled to pull the hooks 7 and projections 58 from underneath plate 13 into the position shown in Fig. 9 where they come against faces 64 of forks 63 on arms 16.

Oil pressure is now applied to the four cylinders 6 by connecting the conduits 56 and 28 through valve 55 to draw the platforms 4 and 5 towards one another to compress the foodstuffs in the tray between plates 13 and 14. The dimensions of the limiting spaces between adjacent plates of the stack are so chosen that as a result of this compression plate 13 and all the plates above it descend further for a sufficient distance to bring the lower part of the freezing station consisting of the space 18 into line with the withdrawn projections 58, which are still in the withdrawn position shown, for example in the case of one projection, in Fig. 9.

The projections 58 are now ready for insertion into freezing station 18 of the stack merely by rotating the shafts 8, and the oil pressure in cylinders 6 is then released by connecting the conduits 28 and 57 through valve 55. More oil is allowed to flow out of cylinder 9 to allow the stack of plates to drop until plate 17 rests on the projections 58. Plate 13, now in contact with the compressed foodstuffs in space 12, continues to drop together with plate 14, platform 4 and the cylinder body 54 until their descent is arrested once more by stopping the flow of oil from cylinder 9, when the freezing station 18 between the plates 13 and 17 is wide enough to receive a second tray of foodstuffs. Since both plates 13 and 14 remain in contact with the foodstuffs in the freezing station 12, quick freezing of these foodstuffs proceeds during the filling of the freezing station 18. The second tray is inserted into the freezing station 18 and the above operations repeated until all the freezing stations between the plates of the stacks are filled with trays of foodstuffs.

After the top freezing station has been filled the projections 58 are removed from under the top plate and oil pressure applied to cylinders 6. In one method of working slots 41 and 49 may now be closed by plugs 47 and 52 respectively and pressure maintained in cylinders 6 for a further period of time sufficient to adequately quick freeze the foodstuffs between the plates of the stack. In the preferred alternative method of working, however, the intervals between the successive insertions of trays into the freezing stations of the stack are arranged to be of sufficient duration as to ensure that by the time the last freezing station has been filled, the foodstuffs loaded in the first freezing station are completely quick frozen and ready for removal, thereby rendering the above mentioned further period of time of quick freezing unnecessary.

When the cycle has been completed, oil pressure is applied to cylinder 9 to raise the stack until platform 5 is in the position 5'. The plugs are removed from the two slots if necessary and the filling operation recommenced. The trays inserted during the first set of filling operations are pushed out on to the conveyor 51 through the discharge slot 49 by the newly inserted trays.

The flow of refrigerant in the plates continues during the filling operation, variations in position of the stack being accompanied by corresponding up and down movement of the tubes 33 and 34 with respect to tubes 35 and 36 of the refrigerant discharge and supply headers 10 and 11.

In the operation described above, the successive freezing stations are loaded beginning with the bottom station 12 and working up through the stack. It will be evident, however, that by appropriate manipulation of the shafts 8 and hooks 7, this procedure can be reversed and the successive stations loaded beginning with the top station and working down through the stack. The latter method of operation can moreover be facilitated by rearranging the hooks as shown in Fig. 12. Referring to this figure, the shafts 8 carry arms 70 that are slotted at 71, the hooks 72 being pivoted in these slots and their swinging movement in a direction toward the stack being limited by the ends 73 of the slots. The hooks are urged in this direction by springs 74 compressed between the hooks and stops 75 carried by the arms 70. The projections 76 of the hooks extend under the edges of and support the plates of the stack as described above. The faces 77 of these projections are inclined in a direction to provide cam faces whereby the hooks are pushed aside by the successive ascending plates against their springs 74 and then snap back underneath said plates to the position shown in Fig. 12.

According to this method of operation, the entire stack of plates is positioned below the loading and discharge openings 41 and 49 by operation of the cylinder 9. Pressure in the cylinders 6 is released and the stack is lifted by the cylinder 9 and wire ropes 2 until the top platform 5 and its plate 78 pass by the hooks, camming them to one side. The hooks then snap back under the plate 78, whereupon the stack is lowered by the wire ropes 2 until the plate 78 is supported by the hooks and the next plate 79 has been lowered sufficiently to open the top freezing station. After loading this station, the cylinders 6 are operated to compress the stack, and the stack is lifted until the plate 79 passes by the hooks and then lowered to support this plate on the hooks. The next freezing station may be loaded immediately or after an appropriate interval as explained above. To accomplish this, the pressure in the cylinders 6 is released and the cylinder 9 is operated to lower the plate 80 and all plates beneath the plate 80 to open the freezing station as shown at 81 in Fig. 12. These operations are repeated throughout the stack of plates.

It is obvious from the above description that with the apparatus of the invention loading always takes place at the same height. This means that conveyors can be used for transporting trays to the apparatus, and the only operation to be performed manually is the pushing of the tray from the conveyor into the casing. Such an operation can be readily performed manually by female operatives, but preferably is carried out mechanically. Furthermore the apparatus according to the invention is such that the maximum quick freezing of the foodstuffs between each pair of plates commences immediately after said pair has been loaded, not only after the whole of the stack has been filled. The duration of the freezing cycle for any one batch of foodstuff is thus considerably reduced. Furthermore, in the preferred method of working mentioned above, the preparation of the next tray of foodstuffs to be quick frozen can proceed at the same time as the previously prepared tray is being inserted into the apparatus. This means that the number of trays required is considerably reduced with consequent saving of floor space. Another advantage of the apparatus of the invention is that in view of the fact that only two narrow slots have to be opened to the atmosphere for filling and discharging purposes, the temperature of the air in the casing does not rise as rapidly as in the case of the prior art arrangements where a complete side of the casing has to be opened to the atmosphere for these purposes. This results in greater refrigeration efficiency. Furthermore, the amount of moist air, which can enter the apparatus from outside during filling and discharge, is also reduced, thereby decreasing the amount of icing on the movable parts within the casing. Again, in the prior art arrangement loading of a large bulk of foodstuffs takes place over a comparatively short space of time. As a result of this method of loading, foodstuffs at room temperature contact the cold trays in comparatively rapid succession. This gives rise to violent surging of the refrigerant medium gas. However, in the apparatus of the present invention the foodstuffs can be loaded in small batches over a comparatively long period of time. The result is that the small surge resulting from the loading of one batch has time to die down before the next tray is loaded so that the intensity of surging is reduced. The progressive loading also has the effect of distributing the load on the refrigerating compressor more evenly, since the compressor of the refrigerating circuit has to cope with a series of small gas surges at uniformly spaced intervals instead of the large surge at the beginning of the freezing period followed by the relative absence of gas at the end of the freezing period, which is the state of affairs experienced with the prior art apparatus.

What is claimed is:

1. Refrigerating apparatus comprising a casing having therein a vertical stack of refrigerated plates movable away from one another to receive material to be frozen between them and toward one another to engage said material during freezing, said casing having a substantially horizontal opening through which the freezing stations between the plates of successive pairs of plates are loaded at the same level, means for vertically raising and lowering said stack relative to said opening to bring said freezing stations successively into loading alignment therewith, auxiliary plate supporting means engageable with an individual plate of the pair of plates adjacent said opening and supporting all of the plates thereabove in the stack of plates whereby the plates of successive pairs are separable to open the freezing stations between them for loading, and pressure means for moving said plates toward one another to compress between them the materials to be frozen.

2. Refrigerating apparatus as defined in claim 1, said casing also having a substantially horizontal unloading opening at the same level with but in the opposite side of said casing from said loading opening.

3. Refrigerating apparatus comprising a casing, a vertical stack of relatively separable refrigerated plates therein providing a series of freezing stations one between each two successive plates of the stack, said casing having a substantially horizontal opening through which said stations can be loaded individually at the same level, means for vertically raising and lowering said stack whereby the two plates of any station can be brought into loading position adjacent said opening, and stop means engageable with an individual plate of the pair of plates adjacent said opening for arresting the movement of one plate of any station while the other plate thereof is moved by said first named means to cause relative separation of the plates of a station, thereby opening said station for loading products to be frozen thereinto.

4. Apparatus as defined in claim 3, in combination with pressure means for moving the plates of the stack toward one another under pressure to compress products loaded into said freezing stations.

5. Apparatus as defined in claim 4, said pressure means being carried by and movable bodily with one of the end plates of the stack and connected to the other end plate thereof for drawing the plates of the stack together.

6. Refrigerating apparatus comprising a casing, a vertical stack of relatively separable refrigerated plates therein providing a series of freezing stations one between each two successive plates of the stack, said casing having a substantially horizontal opening through which said stations can be loaded individually at the same level, means for vertically raising and lowering said stack to bring the lower plate of each station into loading position adjacent said opening, and plate supporting means engageable with individual plates of the stack for supporting the upper plate of each station at a point above said loading position for supporting all of the plates of the stack thereabove whereby each two successive plates can be separated for loading the freezing station therebetween.

7. Refrigerating apparatus comprising a casing, a vertical stack of relatively separable refrigerated plates therein providing a series of freezing stations one between each two successive plates of the stack, said casing having a substantially horizontal opening through which said stations can be loaded individually at the same level, means for vertically raising and lowering said stack to bring the lower plate of each station into loading position adjacent said opening, means interconnecting said plates and determining the spacing therebetween when said stations are empty, and plate supports mounted on said casing and insertable between said plates for supporting the upper plate of each station at a point above said loading position and for supporting the plates of the stack thereabove whereby each two successive plates can be separated for loading the freezing station therebetween.

8. Refrigerating apparatus comprising a casing, a vertical stack of relatively separable refrigerated plates therein providing a series of freezing stations one between each two successive plates of the stack, said casing having a substantially horizontal opening through which each station can be loaded at a common level, means for vertically raising and lowering said stack to bring the lower plate of any station to the loading level adjacent said opening, plate supporting means engageable with individual plates of the stack for supporting the upper plate of any station at a point spaced sufficiently above said level to open the station for loading products to be frozen thereinto and for supporting all of the plates of the stack thereabove, and pressure means for moving the plates of the stack toward one another under pressure to compress products loaded into said freezing stations.

9. Apparatus as defined in claim 8, said pressure means being carried by and movable bodily with one of the end plates of the stack and engaging the other end plate thereof to draw the plates of the stack together.

10. Refrigerating apparatus comprising a casing, a vertical stack of relatively separable refrigerated plates therein providing a series of freezing stations one between each two successive plates of the stack, said casing having a substantially horizontal opening through which each station can be loaded at a common level, means connected to the bottom plate of the stack for vertically raising and lowering the stack, supports interposed between the successive plates and maintaining the stacked plates in spaced relation when said stations are empty, and stops mounted on the casing adjacent said opening and insertable between successive plates to arrest the downward movement of the upper plate of a given station while its lower plate is lowered by said first named means to loading position, thereby separating the plates of said given station for loading, said stop supporting the stack of plates above the loading position.

11. Apparatus as defined in claim 10, in combination with pressure means carried by and movable bodily with one of the end plates of the stack and connected to the other end plate thereof to draw the plates of the stack together under pressure and compress products loaded into said given station when said stops are withdrawn.

12. Refrigerating apparatus comprising a casing, a vertical stack of refrigerated plates therein providing a series of freezing stations one between each two successive plates of the stack, supports interposed between successive plates and on which the empty plates rest by gravity, whereby said empty plates are stacked in spaced relation above and are supported by the bottom plate, means engaging said bottom plate for raising and lowering the stack, said casing having a substantially horizontal opening through which said stations can be loaded individually at a common level, hooks insertable between successive plates for arresting the downward movement of the upper plate of any given station at a point spaced above said loading level while the lower plate of said given station is lowered to said level by said means, thereby separating said upper and lower plates and opening said given station for loading products to be frozen thereinto, said hooks being pivoted on and depending from vertically rocking supporting means mounted on said casing, means for rocking said supporting means downwardly after loading said given station to lower said upper plate onto said products, and resilient means connected to said hooks and effective to swing the same outwardly on their pivots when the load of said upper plate is supported by said products.

13. Refrigerating apparatus comprising a casing, a vertical stack of refrigerated plates therein providing a series of freezing stations one between each two successive plates of the stack, supports interposed between successive plates and on which the empty plates rest by gravity, means engaging the bottom plate of the stack for raising and lowering the stack, said casing having a substantially horizontal opening through which said stations can be loaded individually at a common level, stops insertable between successive plates for arresting the downward movement of the upper plate of any given station while its lower plate is lowered by said means to said common loading level, said stops being withdrawable after loading to lower said upper plate onto the products loaded into said given station, a fluid pressure cylinder carried by one end plate of the stack and having a piston connected to the other end plate of the stack, and a flexible fluid pressure connection controllable externally of said casing for admitting fluid pressure to said cylinder and drawing the plates of the stack together to compress said products.

(References on following page)

References Cited in the file of this patent

UNITED STATES PATENTS

| Number | Name | Date |
|---|---|---|
| 1,822,121 | Barry | Sept. 8, 1931 |
| 1,822,123 | Birdseye | Sept. 8, 1931 |
| 1,887,127 | Hall | Nov. 8, 1932 |
| 1,994,233 | Shaw | Mar. 12, 1935 |
| 2,232,383 | Greig | Feb. 18, 1941 |
| 2,242,527 | Knowles | May 20, 1941 |
| 2,283,923 | Hall | May 26, 1942 |
| 2,307,548 | Stone | Jan. 5, 1943 |
| 2,485,509 | Raye | Oct. 18, 1949 |